(12) United States Patent
Ito

(10) Patent No.: US 6,999,603 B1
(45) Date of Patent: Feb. 14, 2006

(54) DATA GENERATION DEVICE AND DATA GENERATION METHOD, DATA RECEIVER AND DATA RECEPTION METHOD, AND DATA COMMUNICATION SYSTEM AND DATA COMMUNICATION METHOD

(75) Inventor: Takeshi Ito, Tokyo (JP)

(73) Assignee: Sony Computer Entertainment Inc., Tokyo (JP)

(*) Notice: Subject to any disclaimer, the term of this patent is extended or adjusted under 35 U.S.C. 154(b) by 0 days.

(21) Appl. No.: 09/428,756

(22) Filed: Oct. 28, 1999

(30) Foreign Application Priority Data

Oct. 28, 1998 (JP) .............................. P10-307107

(51) Int. Cl.
*G06K 9/00* (2006.01)

(52) U.S. Cl. ........................... 382/107; 463/40

(58) Field of Classification Search ............... 382/103, 382/165, 313, 317; 345/716–726; 725/37, 725/50, 136, 135; 463/5, 51–54, 40, 39; 348/460, 461, 473, 474, 488; 341/137
See application file for complete search history.

(56) References Cited

U.S. PATENT DOCUMENTS

| | | | | |
|---|---|---|---|---|
| 3,675,925 A | * | 7/1972 | Ryan et al. ................ 463/52 |
| 3,960,380 A | * | 6/1976 | Yokoi ....................... 463/50 |
| 3,993,861 A | | 11/1976 | Baer |
| 4,205,847 A | | 6/1980 | Steiger et al. |
| 4,290,757 A | * | 9/1981 | Marshall et al. ........... 434/12 |
| 4,329,684 A | | 5/1982 | Monteath et al. |
| 4,613,904 A | | 9/1986 | Lurie |
| 4,844,476 A | | 7/1989 | Becker |
| 5,073,931 A | | 12/1991 | Audebert et al. |
| 5,618,045 A | * | 4/1997 | Kagan et al. .............. 463/40 |
| 5,959,717 A | * | 9/1999 | Chaum ..................... 352/40 |
| 6,056,640 A | * | 5/2000 | Schaaij ..................... 463/4 |
| 6,251,011 B1 | * | 6/2001 | Yamazaki .................. 463/51 |

FOREIGN PATENT DOCUMENTS

| | | |
|---|---|---|
| DE | 2653093 | 9/1977 |
| EP | 0 596 823 | 5/1994 |
| EP | 0 679 986 | 11/1995 |
| JP | 53-105100 | 9/1977 |
| JP | 55-112636 | 8/1980 |
| JP | 8-280937 | 10/1996 |
| JP | 9-034728 | 2/1997 |
| JP | 9-313738 | 12/1997 |
| JP | 10-118338 | 5/1998 |
| WO | WO 98/07485 | 1/1998 |

* cited by examiner

*Primary Examiner*—Samir Ahmed
(74) *Attorney, Agent, or Firm*—Katten Muchin Rosenman LLP

(57) ABSTRACT

According to the present invention, it is possible to, when an already available data communication system is used, transmit digital data other than data that is the main communication object of the data communication system.

A data broadcast station (2) of this invention has a digital data encoder (7), which changes, each unit time, the color of part of a moving image based on digital data that is input and generates image data. A data reception terminal (4) which has a moving image display device (10), which displays a moving image based on image data, a light sensing device (12), which senses the light of part of the moving image displayed on the moving image display device (10), and a digital data decoder (13), which detects the change, each unit time, in the color of part of the moving image whose light is sensed by the light sensing device (12) and generates the digital data.

13 Claims, 12 Drawing Sheets

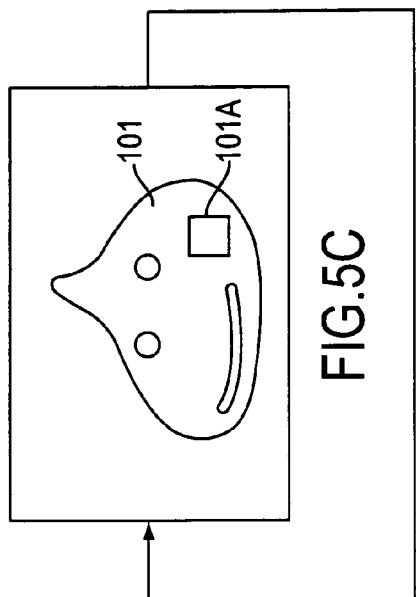
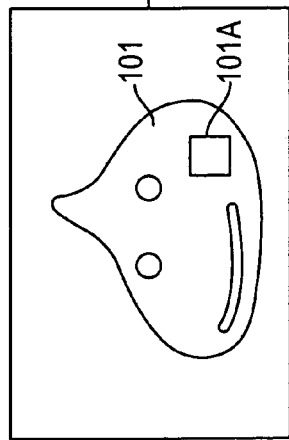
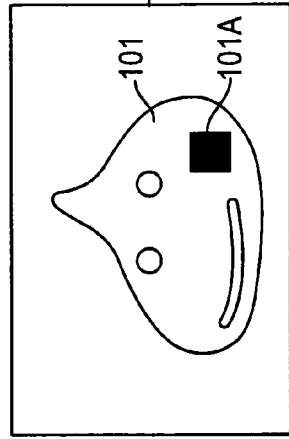
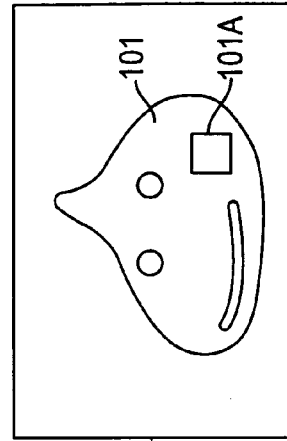
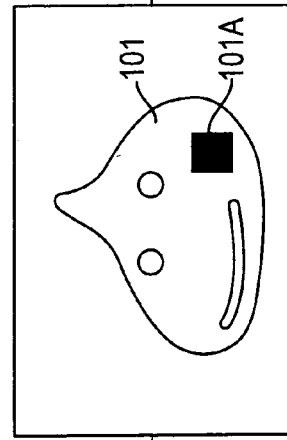
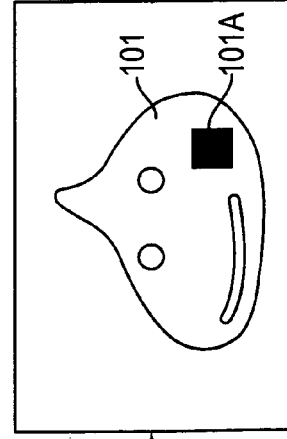

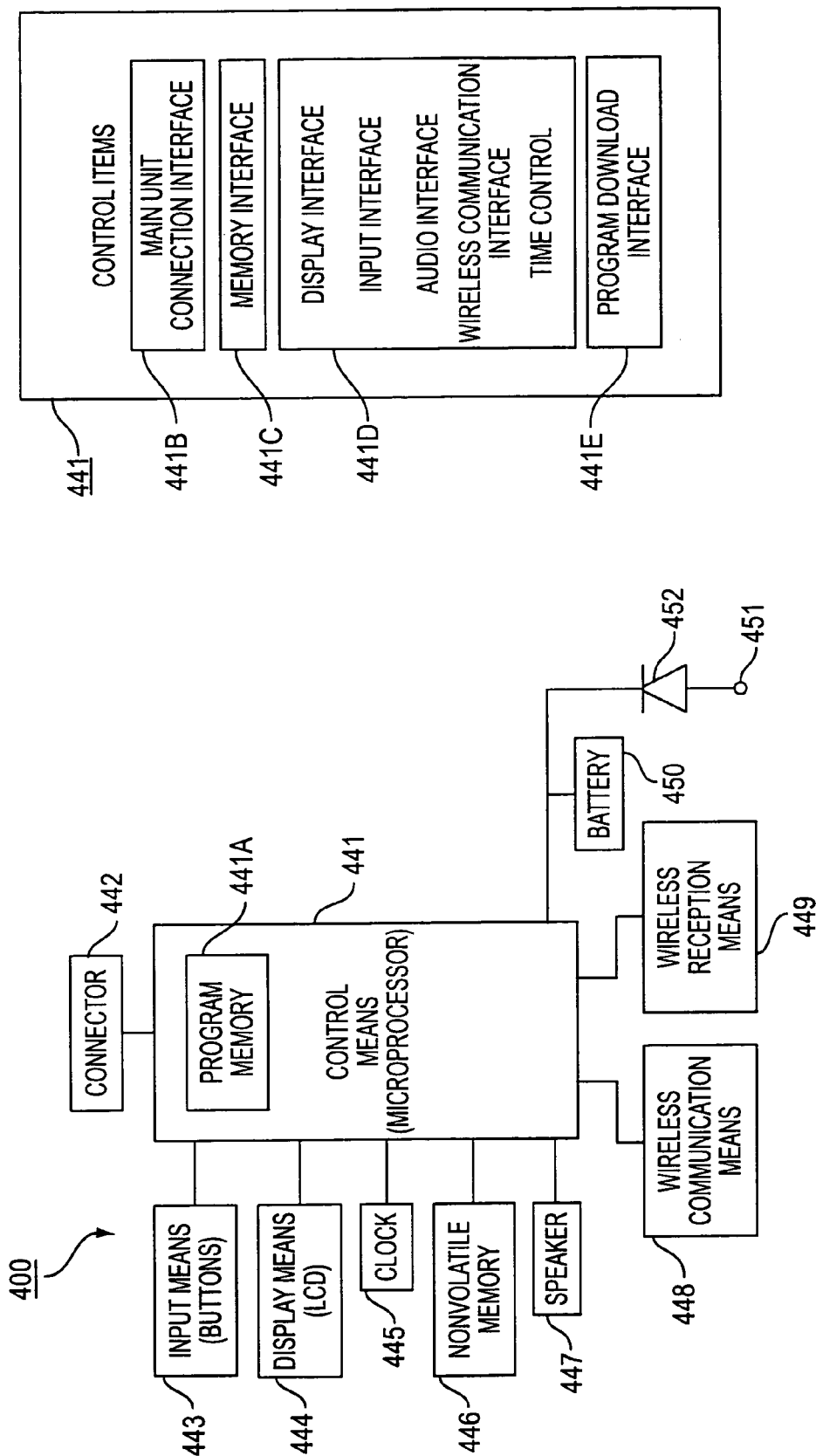

DATA GENERATION DEVICE AND DATA GENERATION METHOD, DATA RECEIVER AND DATA RECEPTION METHOD, AND DATA COMMUNICATION SYSTEM AND DATA COMMUNICATION METHOD

BACKGROUND OF THE INVENTION

1. Field of the Invention

This invention relates to a data generation device and data generation method that generate digital data, a data receiver and data reception method that receive digital data, and a data communication system and data communication method that transmit and receive digital data. More specifically, the present invention relates to a data generation device and data generation method, a data receiver and data reception method, and a data communication system and data communication method that are suitable for portable information terminals, computers, game machines, etc.

2. Background of the Invention

Digital data communication systems have shown rapid growth in recent years. General digital data communication systems include those that receive data from data reception terminals, such as personal computers, in which a dedicated modem is connected to a public telephone line. Also, digital data communication has come to be done in recent years with so-called portable telephones, that is, telephone sets that are convenient to carry about outdoors.

Building a data communication system normally requires the availability of a large communication infrastructure.

If one uses a communication infrastructure that assumes audio data communication such as the aforementioned public telephone lines, one needs the specialized device known as a modem for receiving data from the data communication network on a data reception terminal.

For example, if a video game device can receive data from the image displayed on a display means such as a monitor, the functions of the video game devices will be expanded, and one's enjoyment will be enhanced by making use of those functions.

SUMMARY OF THE INVENTION

It is an object of this invention, which was devised in consideration of the aforementioned situation, to provide a data generation device and data generation method, a data receiver and data reception method, and a data communication system and data communication method that can transmit digital data other than the moving image data that is the main object of the moving image transmission and reception equipment that makes use of an already available moving image transmitter-receiver, moving image transmission means, etc.

This and other objects are attained by a data generation device according to the present invention which includes an encoded image data generation means that generates image data by changing the color of part or all of a moving image per unit time based on digital data that is input.

With the data generation device of the present invention, digital data can be encoded in the moving image by changing the color of the moving image.

To solve the above discussed problems, the data generation method of this invention generates image data in which the color of part or all of a moving image is changed per unit time based on digital data.

With the data generation method of the present invention, digital data can be encoded with respect to this moving image by changing the color of the moving image.

It is another object of the present invention to provide a data receiver which includes a light sensing means that senses the light of part or all of the moving image displayed on the display means, and a data generation means that detects the change each unit time in the color of part or all of the moving image sensed by the light sensing means and decodes and generates digital data.

The data receiver having such a configuration detects the change per unit time in the color of part or all of the moving image that is sensed by the light sensing means, and decodes the digital data, and generates it by the data generation means.

In this way the data receiver is able to detect the changes in the color of the moving image and decode the digital data.

Yet another object of the present invention is to provide a data reception method which senses the light of part or all of the moving image displayed on the display means, detects the change each unit time in the color of part or all of the moving image whose light is sensed, and generates digital data.

This data reception method of this invention makes it possible to detect changes in the color of the moving image and decode the digital data.

The objects of the present invention are also attained by a data communication system which has in its data transmitter an encoded image data generation means that changes the color per unit time of part or all of the image based on digital data that is input and generates image data, and a transmission means that transmits image data, and has in its data receiver a reception means that receives image data, a display means that displays a moving image based on the image data, a light sensing means that senses the light of part or all of the moving image displayed on the display means, and a digital data decoding means that detects the change each unit time in the color of part or all of the moving image sensed by the light sensing means and decodes and generates the digital data.

The data communication system having such a configuration generates, by the encoded image data generation means of the data transmitter, image data in which the color of part or all of the image is changed per unit time based on input digital data, and transmits the image data by the transmission means. And it displays the moving image by the display means of the data receiver based on image data received by the reception means and senses by the light sensing means the light of part or all of this displayed moving image. The data receiver detects the change each unit time in the color of part or all of the moving image whose light is sensed by the light sensing means, and decodes the digital data and generates it by its data decoding means.

This data communication system makes it possible to transmit a moving image in which digital data is encoded by changes in color, and to decode the digital data by detecting the color changes in this transmitted moving image.

Yet another object of the present invention is attained by a data communication method which generates image data in which the color of part or all of a moving image is changed per unit time based on digital data, displays the moving image on the display means based on the image data, senses the light of part or all of the moving image displayed on the display means, detects the change each unit time in the color of part or all of the moving image whose light is sensed, and decodes and generates the digital data.

This data communication method makes it possible to transmit a moving image in which digital data is encoded by changes in color, and to decode the digital data by detecting the color changes in this transmitted moving image.

BRIEF DESCRIPTION OF THE DRAWINGS

FIGS. 5A through 5F are diagrams that show a specific example obtained when digital data is transmitted by changing the color of part of the image;

FIGS. 12A and 12B are block diagrams showing circuitry of the portable electronic device.

DETAILED DESCRIPTION OF THE PREFERRED EMBODIMENT

In the following, we describe in detail an embodiment of this invention, with reference to the drawings.

[Data Communication System]

A data communication system of this embodiment is a system in which a moving image is transmitted and received between a moving image transmitter and a moving image receiver. The data communication system is, for example, a ground wave television broadcasting system that performs television broadcasting by an NTSC signal. For example, in a ground wave television broadcasting system that operates by an NTSC signal, the image transmission rate is normally 60 fields (30 frames) per second.

Figure 1:
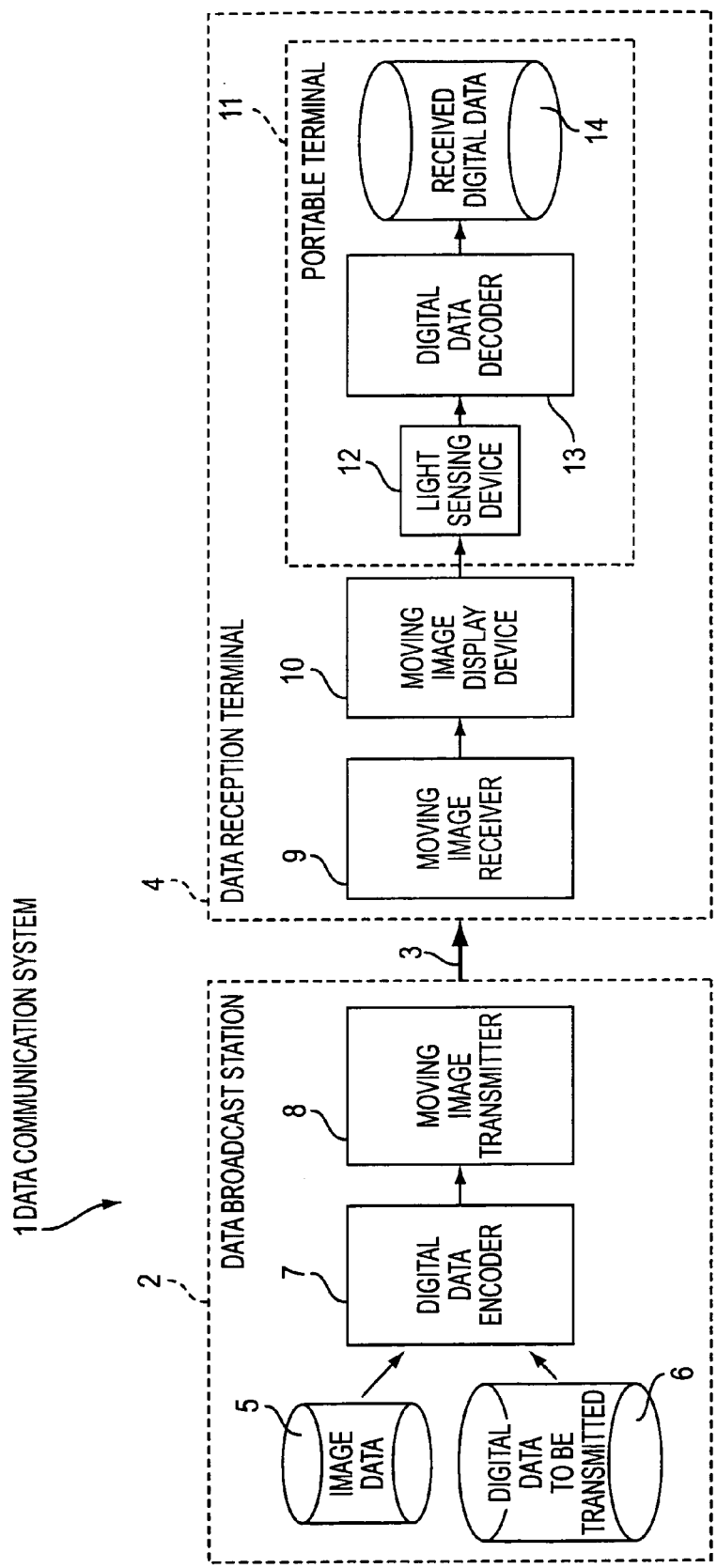
FIG. 1 is a block diagram showing the configuration of an embodiment of a data communication system of the invention.

As shown in FIG. 1, the data communication system of this embodiment is comprised of a data broadcast station 2, which broadcasts a moving image and other data, and a data reception terminal 4, which receives broadcasting from data broadcast station 2 via moving image transmission means 3 which will be explained in detail below.

Data broadcast station 2 has a digital data encoder 7, which encodes digital data, that is to be transmitted, to the image data stored in memories 5 and 6, respectively, and a moving image transmitter 8, which transmits the image data generated by a digital data encoder 7. The data reception terminal 4 has a moving image receiver 9, which receives broadcasting from data broadcast station 2, a moving image display device 10, which displays a moving image, and a portable terminal 11, which can receive image data from data broadcast station 2 via moving image display device 10. The portable terminal 11 has a light sensing device 12, a digital data decoder 13, which decodes the digital data based on the light received by light sensing device 12, and a memory 14, which stores the decoded digital data.

In the data communication system 1 having such a configuration, data broadcast station 2 has the digital data encoder 7, which is an image data generation means that generates image data by changing the color of part of the moving image per unit time based on the digital data that is input to it, and moving image transmitter 8, which is a transmission means that transmits image data. The data reception terminal 4 has moving image receiver 9, which is a reception means that receives image data, moving image display device 10, which is a display means that displays moving images based on the image data, light sensing device 12, which is a light sensing means that senses the light of part of the moving image displayed on moving image display device 10, and digital data decoder 13, which is a data generation means that detects changes in each unit time of the color of part of the moving image whose light is received by light sensing device 12 and generates digital data.

Next, each part that makes up this data communication system 1 will be described in detail.

[Data Broadcast Station]

Memories 5 and 6 are memory means that store image data or digital data to be transmitted (hereafter called transmission digital data). For example, memories 5 and 6 are disk drives or tape recorder devices, etc.

Digital data encoder 7 generates image data in which the color of part of the moving image is changed each unit time based on the transmission digital data that is input.

Specifically, digital data encoder 7 suitably embeds transmission digital data into the moving image, with changing the color in each image for a prescribed region of the image, in accordance with the transmission digital data. The embedding of the transmission digital data into the image that is done here is done by superimposition, etc. In this way, digital data encoder 7 transforms the transmission digital data into a form that can be transmitted using the moving image. That is, the transmission digital data is constituted as the entirety of each image, that is, as one item of data in the moving image.

The interval at which data is inserted is one with respect to each field of the moving image. That is, in this case, the aforesaid "each unit time" means each time interval between fields.

Also, "color" means taking the element of hue, brightness, or chroma. That is, digital data encoder 7 encodes the transmission digital data into the moving image by modifying one among the three elements hue, brightness, or chroma.

Figure 2:
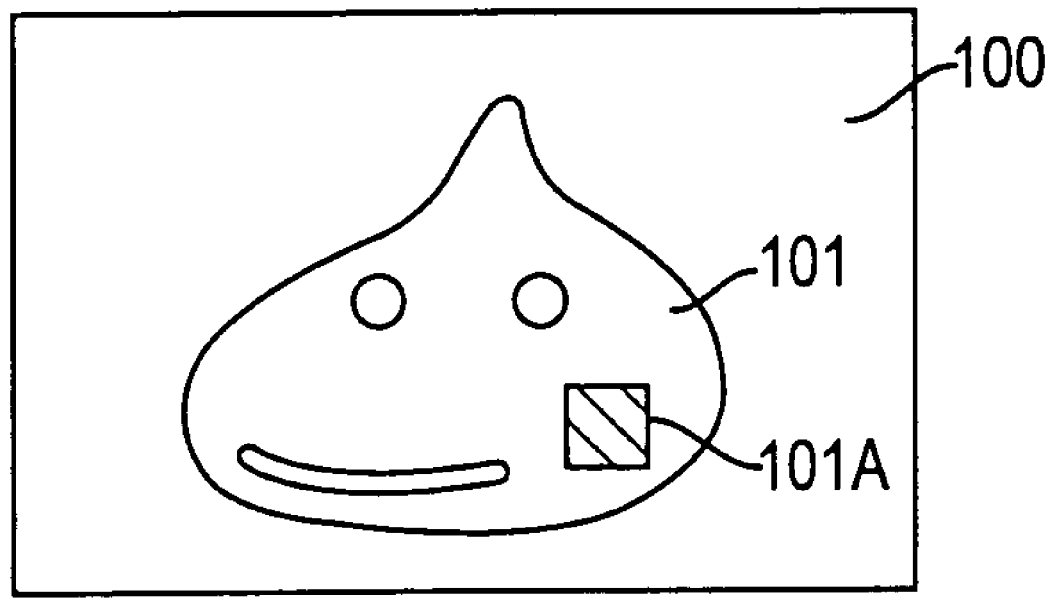
FIG. 2 is a diagram for explaining how digital data is encoded in part (the digital data encoded region) of the image broadcast by a data broadcast station of the data communication system of FIG. 1.
Figure 3A:
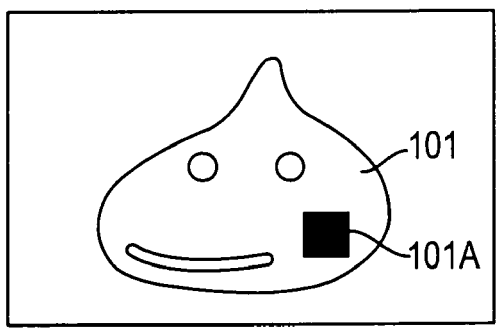
FIGS. 3A and 3B are diagrams for explaining how digital data is encoded by changing the color of part of the image.
Figure 3B:
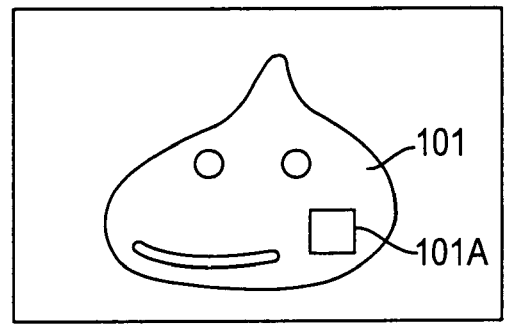

Referring to FIGS. 2 and 3A, 3B, the processing by which digital data encoder 7 encodes the transmission digital data with respect to the image will be now explained.

As shown in FIG. 2, digital data encoder 7 encodes the transmission digital data in a partial image region (hereafter called the digital data encoding region) 101a of image 101 in an image region 100 that is output to moving image display device 10. That is, digital data encoder 7 encodes the transmission digital data by changing the color of digital data encoding region 101a, which is part of image 101.

FIG. 3 shows image 101 in which the color of digital data encoding region 101a has been changed. Digital data encoder 7 changes the color of digital data encoding region 101a to black as shown in FIG. 3A, or changes the color of digital data encoding region 101a to white as shown in FIG. 3B. For example, by making black correspond to "0" and white correspond to "1", it can be made into a binary value; that is, display using bit is possible. In this way, the data of one bit can be allocated to one field, and the transmission digital data can be encoded to image 101 one bit per field. Thus, if it is applied to ground wave television broadcasting by NTSC signal as in this embodiment, the image transmission rate is 60 fields per second, so data transmission can be done at 60 bit/sec. As desired, one can encode one bit of data every several fields, that is, intermittent encoding with respect to the image field can be carried out, rather than encoding the transmission digital data in the image of all the fields.

Here the explanation assumes that the color of digital data encoding region 101a is changed to white or black, but that is for convenience of description and is therefore not limited to this. One can use other colors as desired. Moreover, it can be displayed not just with visible light but with light outside the visible range, such as infrared. That is, the display can be done with light rays having a prescribed frequency.

Also, the explanation is made with digital data encoding region 101a, which is part of the moving image, but it is not necessarily limited to a part. For example, if displayed with nonvisible light, the entire moving image can be used as digital data encoding region 101a without affecting the appearance of the moving image.

The image data in which the transmission digital data is encoded by this digital data encoder 7 as described above is input into moving image transmitter 8.

Moving image transmitter 8 performs processing for transmitting image data through moving image transmission means 3. For example, moving image transmitter 8 consists of a transmitter having a modulation means and an antenna, performs modulation processing by the modulation means, and transmits image data to moving image transmission means 3. Data reception terminal 4 receives the image data broadcast from this moving image transmitter 8.

Here, moving image transmission means 3 is a signal transmission means for ground waves. Moving image transmission means 3 may also be a signal transmission means that is part of a satellite broadcast system.

Data broadcast station 2, which has such a configuration, performs encoding of the transmission digital data with respect to the image data by means of digital data encoder 7. And data broadcast station 2 transmits to moving image transmission means 3, by moving image transmitter 8, the image data in which the transmission digital data is encoded.

[Data Reception Terminal]

Moving image receiver 9 of data reception terminal 4 is a means that performs processing for receiving the image data that is transmitted to it via moving image transmission means 3. For example, moving image receiver 9 consists of an antenna and a receiver that has a modulation means, and by means of its modulation means modulates the image data that is transmitted to it via moving image transmission means 3. The image data received by this moving image receiver 9 is input into moving image display device 10.

Moving image display device 10 is a device that displays images. The moving image display device 10 is, for example, a monitor. Moving images are output on the display screen of this moving image display device 10 based on the image data that is received. Transmission digital data is encoded in the moving images displayed on the display screen as described above.

Figure 4A:
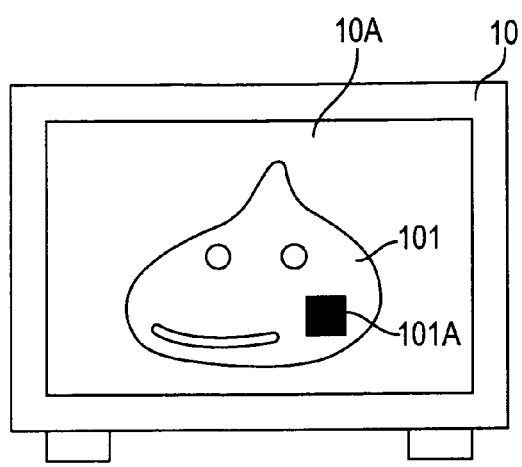
FIGS. 4A and 4B are diagrams that show the image that is received and displayed on the moving image display device of a data reception terminal of the data communication system of the present invention.
Figure 4B:
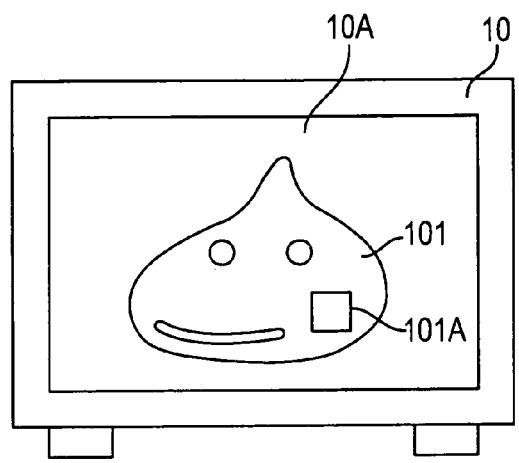

FIGS. 4A and 4B show image 101 that is output to a display screen 10a of moving image display device 10. FIG. 4A shows the output of image 101 that corresponds to FIG. 3A above; that it, FIG. 4A shows image 101 that is output to display screen 10a in which digital data encoding region 101a is set to black. FIG. 4B shows the output of image 101 that corresponds to FIG. 3B above; that it, it shows image 101 that is output to display screen 10a in which digital data encoding region 101a is set to white.

(Portable Terminal)

Portable terminal 11 senses the light of part of the image output on display screen 10a of this moving image display device 10, that is, digital data encoding region 101a by light sensing device 12.

Light sensing device 12 is constituted so as to sense the light of digital data encoding region 101a, which is part of the moving image output on display screen 10a. For example, light sensing device 12 has a directional light sensing element and by means of it senses the light of part of the moving image. In this way, the light of the image output of a prescribed region in display screen 10a can be sensed.

For example, in order to detect the change in the color of digital data encoding region 101a, light sensing device 12 has a sensor that can detect the frequency of the color, as a light sensing element such as, for example, a photodiode.

Moreover, light sensing device 12 is able to sense light by putting the light sensing part of light sensing device 12 into direct contact with the display screen. In this way, light sensing device 12 can sense light even if it does not have directionality.

Light sensing device 12, which has such a composition, detects the color, whether black or white, of digital data encoding region 101a of image 101 shown in FIG. 4. A digital data decoder 13 is input with the signal that is output based on the light sensed from this light sensing device 12.

Digital data decoder 13 decodes the transmission digital data based on the signal output of light sensing device 12. That is, digital data decoder 13 sets the data to "0" if the signal output from light sensing device 12 is black, and to "1" if it is white. The transmission digital data decoded in this way is stored in memory 14. Memory 14 is, for example, a memory means such as a hard disk or computer memory.

Data reception terminal 4, which has the aforesaid composition, receives by moving image receiver 9 the image data that is transmitted to it via moving image transmission means 3. And data reception terminal 4 outputs a moving image to moving image display device 10 based on this received image data. Portable terminal 11, by light sensing device 12, senses the light of digital data encoding region 101a, which is part of the moving image output on this moving image display device 10. Portable terminal 11 decodes the transmission digital data by means of digital data decoder 13 based on the results of the light sensing and stores the decoded transmission digital data in memory 14.

The parts of data communication system 1 are composed as described above. In this data communication system 1, data communication system 1 transmits image data in which transmission digital data is encoded in data broadcast station 2. Data reception terminal 4 receives the image data that is transmitted to it and outputs the moving image by means of moving image display device 10, in the same way as with ordinary television broadcasting. Meanwhile, portable terminal 11 decodes and obtains the transmission digital data from image 101, which is output to moving image display device 10.

The case in which a moving image consisting of multiple images as shown in FIGS. 5A through 5F is transmitted and received, is specifically described. Here the color of digital data encoding region 101a for each field changes to, in the sequence, black, white, white, black, black, white.

If image 101 comes transmitted from data broadcast station 2 while the color of digital data encoding region 101a is varied with each field, portable terminal 11 can decode 6 bits of digital data as "0", "1", "1", "0", "0", "1". In this way, the received digital data becomes data that can be put to use by the user as, for example, various information.

Also, portable terminal 11, which serves ultimately as a terminal that receives transmission digital data, consists for example of a portable information terminal, a so-called PDA (personal digital assistant). Also, portable terminal 11 functions as a portable game device, and the digital data that is received as described above can be used in the execution of data.

For example, in portable terminal 11, the received digital data is used for playing a game.

Also, according to the received digital data, images in which said digital data is encoded can be used as game characters. As described below, image 101 is generated as a character based on the transmission digital data and is used as a game.

As described above, in data communication system 1, it is possible to construct a digital data communication system in which digital data is transmitted using the already available infrastructure of the NTSC-signal ground wave television reception system. That is, this invention makes it possible to build, a digital communication system that transfers digital data simply and inexpensively. In this way, digital data can be transmitted in real time to multiple terminals all at once.

A specific example will be described with reference to FIGS. 6 and 7.

Figure 6:
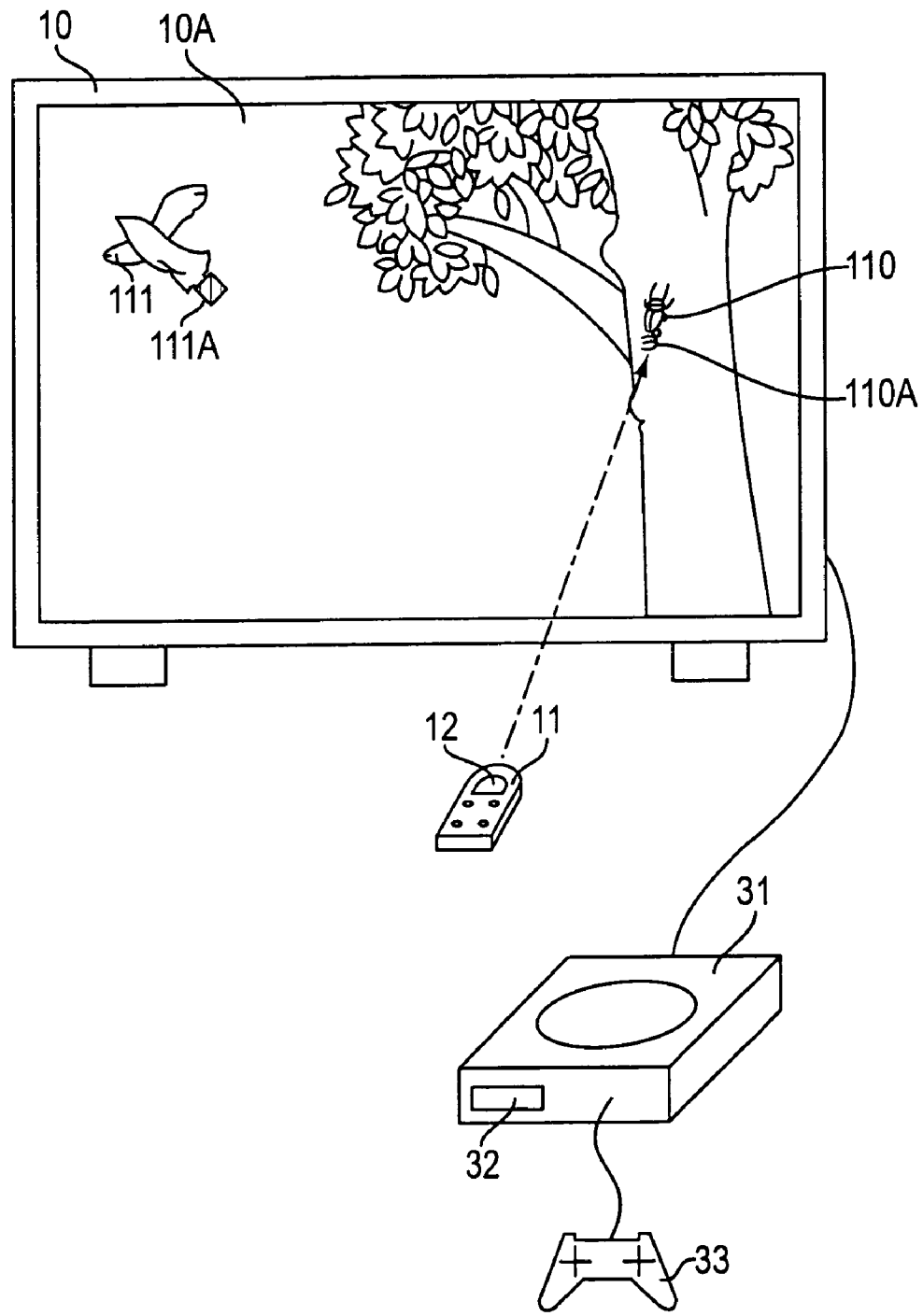
FIG. 6 is a schematic view of an example obtained when the present invention is applied to an entertainment system.

FIG. 6 shows an entertainment system that realizes the collection of insects screen-displayed on display screen 10a. That is, this allows a user to collect insects in the image of a television broadcast.

Here the entertainment system consists of portable terminal or device 11, which can freely be carried around, and a video game device 31. Video game device 31 has a controller 33 and also a mounting unit 32, in which portable terminal 11 can be mounted and from which it can be detached.

In this entertainment system, if the sensor of the light sensing device has directionality, the user points portable terminal 11 at insect 110 output on display screen 10a in order to obtain the insect whose image is displayed. If the sensor is non-directional, he puts it near or on the monitor screen. Here, portable terminal 11 begins decoding of the transmission digital data by detecting, by means of light sensing device 12, the light of digital data encoding region 110a that forms part of insect 110. Then portable terminal or device 11 sends the decoded transmission digital data to video game device 31.

Transmission of the transmission digital data from portable terminal 11 to video game device 31 is done by mounting portable terminal 11 in mounting unit 32 of video game device 31. The transmission of the data from portable terminal 11 to video game device 31 may be done by a wireless communication using, for example, infrared rays.

With video game device 31, erasing, etc. of insect 110 is done based on the transmission digital data input from portable terminal 11. For example, processing is done in which completion of the capture of the data relating to the image is detected, and the image of insect 110 is erased.

Meanwhile, the digital data that is obtained is also stored in portable terminal 11. For example, portable terminal 11 displays captured insect 110 on the display unit 12. In this way, the user is able to keep captured insects in portable terminal 11.

Thus one can realize a bug collection game in the entertainment system. Also, the characters are not limited to insects; one can also have as a character a bird 111 that has digital data encoding region 111a.

Figure 7:
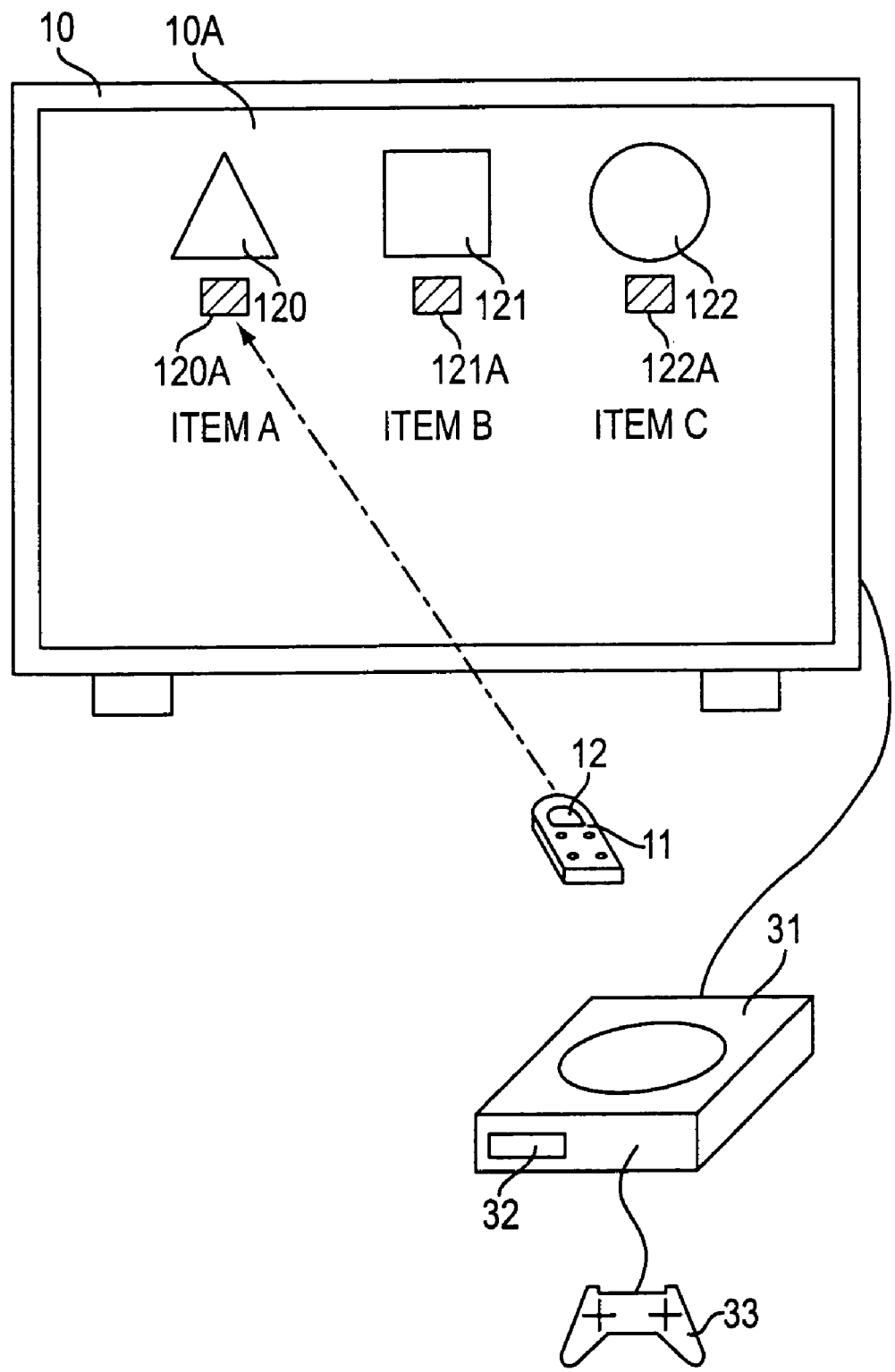
FIG. 7 is a schematic view of another example obtained when the invention is applied to an entertainment system.

FIG. 7 shows an entertainment system in which one can obtain the desired item from multiple items displayed on display screen 10a. In this way the user can obtain from among the images of a television broadcast the item to be used in a video game. FIG. 7 shows item A, item B, and item C as a triangle, square, and circle, respectively, but this is just for convenience; what would be displayed in practice is, for example, shapes corresponding to the names of the items.

In this entertainment system, in order to obtain desired item A from among items A, B, and C, the user points portable terminal 11 at item 120 output on display screen 10a. Here, decoding of the transmission digital data is begun by detecting, by means of light sensing device 12 of portable terminal 11, the light received from a digital data encoding region 120a that forms part of item 120. Then portable terminal 11 sends the decoded transmission digital data to video game device 31.

Transmission of the transmission digital data from portable terminal 11 to video game device 31 is done by mounting portable terminal 11 in mounting unit 32 of video game device 31. The transmission of the data from portable terminal 11 to video game device 31 may be done by wireless.

A user can obtain a desired item A through such operations and make the video game progress by using the item A.

In this way, it becomes possible to decode the transmission digital data that is encoded in the moving image and use it as data for purposes of a game.

In the embodiment, digital data encoder 7 is made to transmit one bit of digital data per frame using the digital data encoding region, but of course one may transmit signals having more bits by changing the display luminance in the vertical or horizontal direction of the scan lines of the image, or by changing the chroma.

Also, a display similar to a so-called barcode may be made in the digital data encoding region. For example, in this case, by a display similar to a barcode, one can distinguish images to which this display is attached.

In the above-described embodiment, digital data is encoded by having a digital data encoding region in part of the moving image, but one can also encode the digital data by changing the color of the entire image. That is, the transmission digital data can be encoded by changing the color of the entire image 101 described above.

Portable terminal 11 can encode the transmission digital data based on the light received both in the visible spectrum and in the infrared range. For example, in this case, light sensing device 12 has a means for switching the received light between visible light and infrared rays. In this way, the transmission digital data can be encoded by changing the color of the digital data encoding region as visible light or infrared rays.

Figure 8:
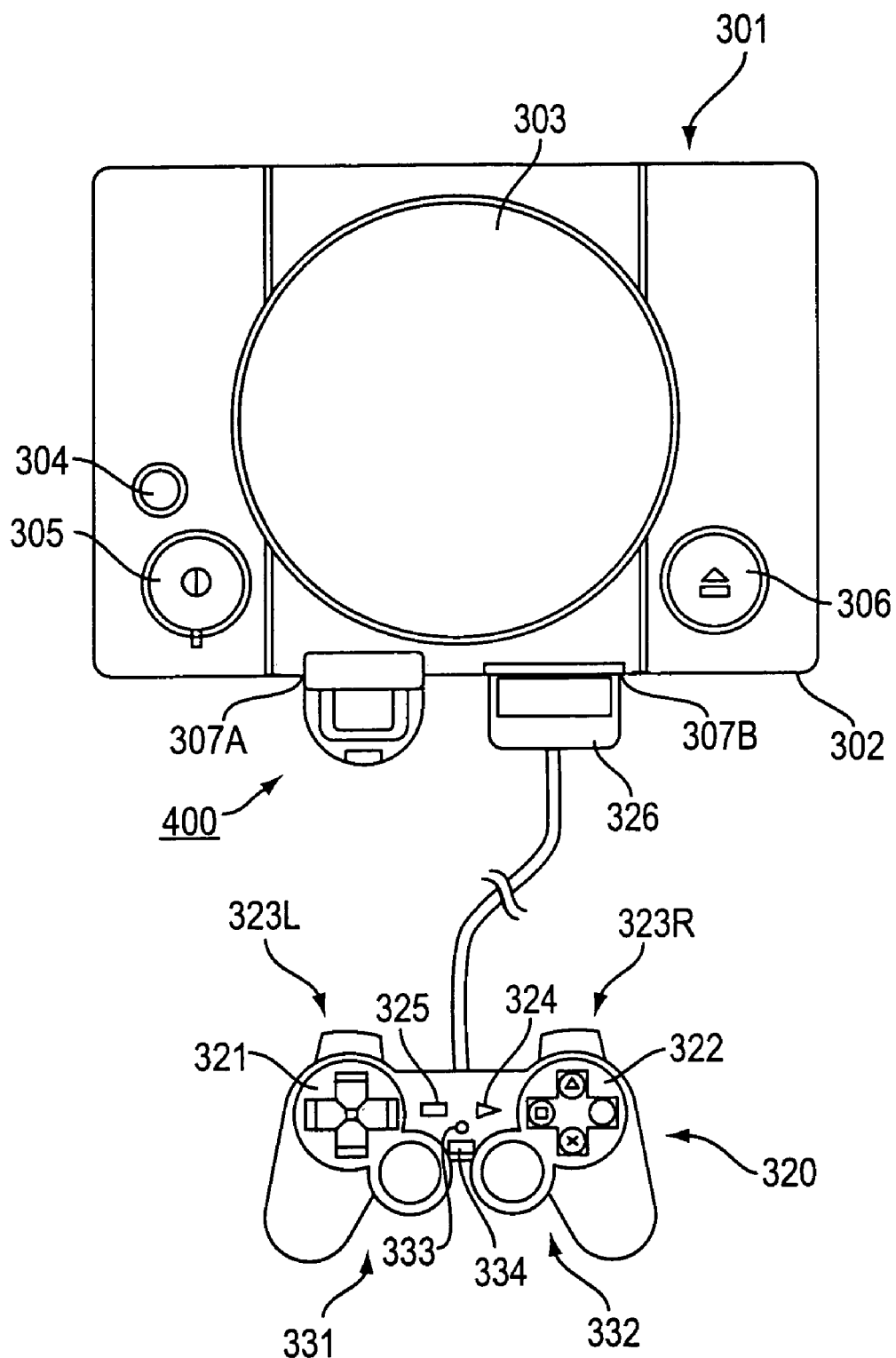
FIG. 8 is a plan view showing the configuration of an entertainment system that includes a portable electronic device and a video game device.

Next, a specific example of the above entertainment system will be described. As shown in FIG. 8 the entertainment system includes a video game device 301 and a portable electronic device 400. The video game device 301 corresponds to aforesaid video game device 31, and portable electronic device 400 corresponds to aforesaid portable terminal 11.

Figure 9:
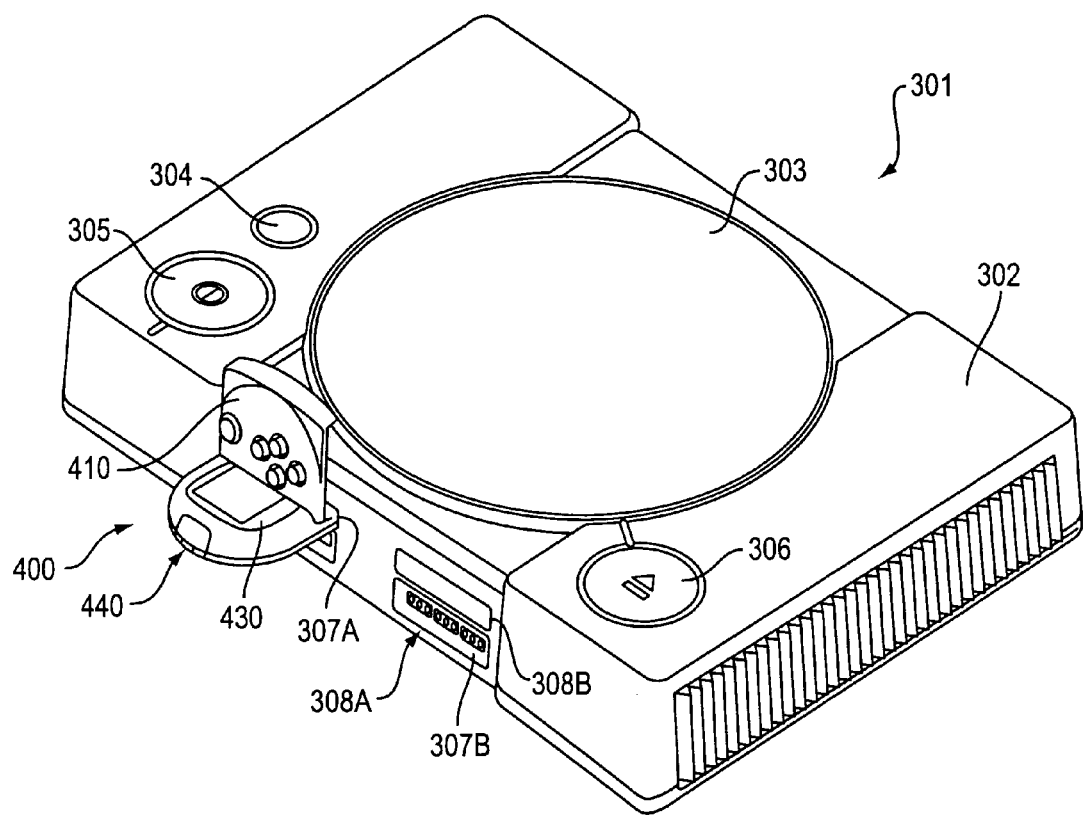
FIG. 9 is a perspective view showing the configuration of an entertainment system to which the present invention is applied.

As shown in FIGS. 8 and 9, the portable electronic device 400 can be mounted on and detached from the video game device 301 and performs data communication with said video game device 301. In this entertainment system, video game device 301 forms the so-called base machine, while portable electronic device 400 forms the so-called terminal machine. For example, in this entertainment system, video game device 301 is constituted as a means that executes game programs stored on a CD-ROM or other storage medium.

As shown in FIGS. 8 and 9, video game device 301 is for reading an application program stored on the storage medium and executing it in accordance with instructions from the user (game player). For example, by game execution, it performs mainly progress of the game, display, and sound control.

A main unit 302 of video game device 301, which is housed in a roughly square-shaped housing, has in its middle a disk mounting unit 303 on which is mounted a CD-ROM or other optical disk that is a storage medium for supplying video game and other application programs, as well as a reset switch 304 for arbitrarily resetting the video game, power switch 305, disk operation switch 306 for operating the mounting of an optical disk, and two slots 307A and 307B.

Also, video game device 301 may be constituted so that application programs are supplied via a communication circuit, not just supplied from a storage medium. For example, it may be constituted so that data can be received from a broadcast circuit or other communication circuit.

Portable electronic device 400 or controller 320 can be connected to slots 307A and 307B. Here, controller 320 corresponds to the aforementioned controller 33. Slots 307A and 307B correspond to the aforementioned connection unit 32.

Controller 320 has first and second operation parts 321 and 322, a left-hand button 323L, a right-hand button 323R, a start button 324, a selection button 325, analog-operable operation parts 331 and 332, a model selection switch 333 by which one selects the operation mode of these operation parts 331 and 332, and a display unit 334 for displaying the selected operation mode. Although not shown, a vibration-causing mechanism is provided inside controller 320. The vibration-causing mechanism causes said controller 320 to vibrate in accordance with, for example, the progress of the video game. This controller 320 is electrically connected to slot 307B of main unit 302 by connection part 326.

For example, by connecting two controllers 320 to slots 307A and 307B, two users can share this entertainment system; that is, for example, they can play a competitive game against each other. Slots 307A and 307B are not limited to two systems like this.

Figure 10A:
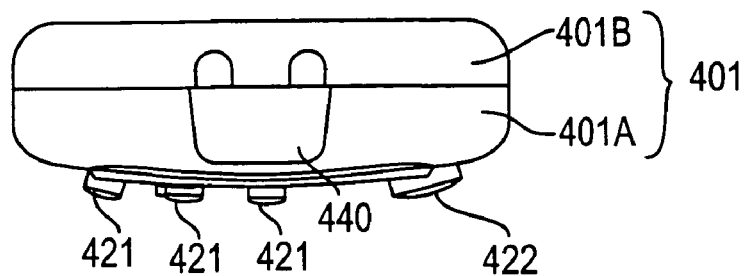
FIGS. 10A through 10C schematically show a configuration of the portable electronic device.
Figure 10B:
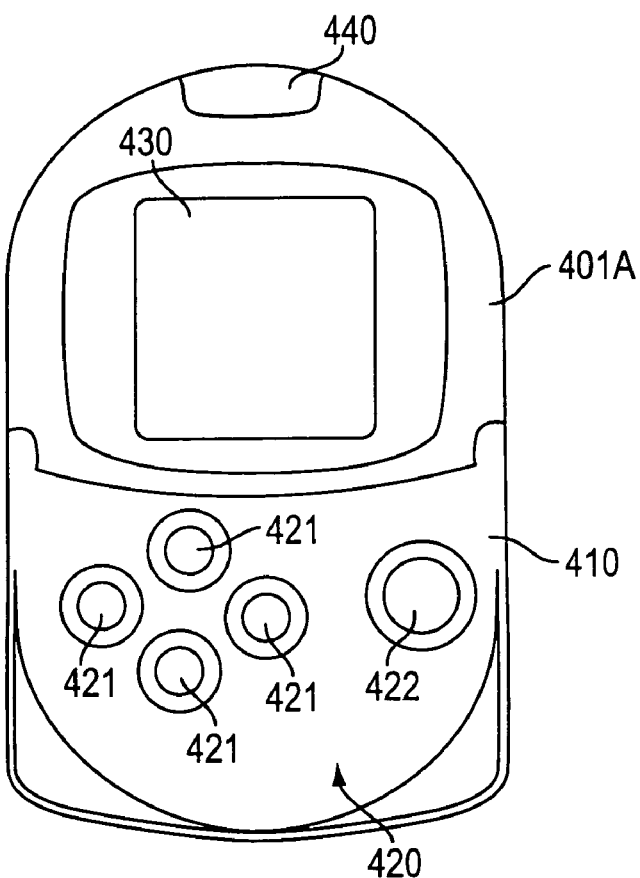
Figure 10C:
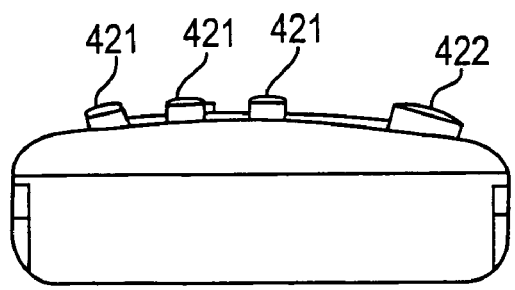

As shown in FIGS. 10A through 10C, portable electronic device 400 has a housing 401, and is equipped with an operation unit 420 for the input of various information, display unit 430, which consists of a liquid crystal display (LCD), etc., and window unit 440 for performing wireless communication by a wireless communication means, such as by infrared rays.

Housed inside housing 401, which consists of an upper shell 401a and a lower shell 401b, is a substrate on which are memory elements, etc. The housing 401 is shaped so that it can be inserted into slots 307A and 307B of main unit 302 of video game device 301.

A window unit 440 is provided at the other end of housing 401, which is formed in a roughly semicircular shape. A display unit 430 takes up about half the area of upper shell 401a that constitutes housing 401, and is positioned near window 440.

Operation unit 420, which has one or more operation buttons 421, 422 for performing event input and making various selections, etc., is formed in upper shell 401a in the same way as window unit 440, lies on the opposite side of said window unit 440, and take up about half of its area. The operation unit 420 is constituted on top of cover 410, which is supported rotatably with respect to housing 401. Here, operation buttons 421, 422 are arranged from the upper surface side to the lower surface side of this cover 410 and pierce this cover 410. These operation buttons 421, 422 are made so that they can move in or out with respect to the upper surface of cover 410 and are supported by said cover 410.

Portable electronic device 400 has a substrate that is inside housing 401 and is positioned corresponding to the arrangement position of cover 410, and it also has switch pressing units on this substrate. The switch pressing units are provided in positions corresponding to the positions of operation buttons 421, 422, in the state with cover 410 closed. Thus when operation buttons 421, 422 are pressed, the switch pressing unit presses a pressure switch, such as a diaphragm switch.

As shown in FIG. 9, portable electronic device 400, in which operation unit 420 is thus formed in cover 410, is mounted into main unit 302 of video game device 301 with its cover 410 open.

Figure 11:
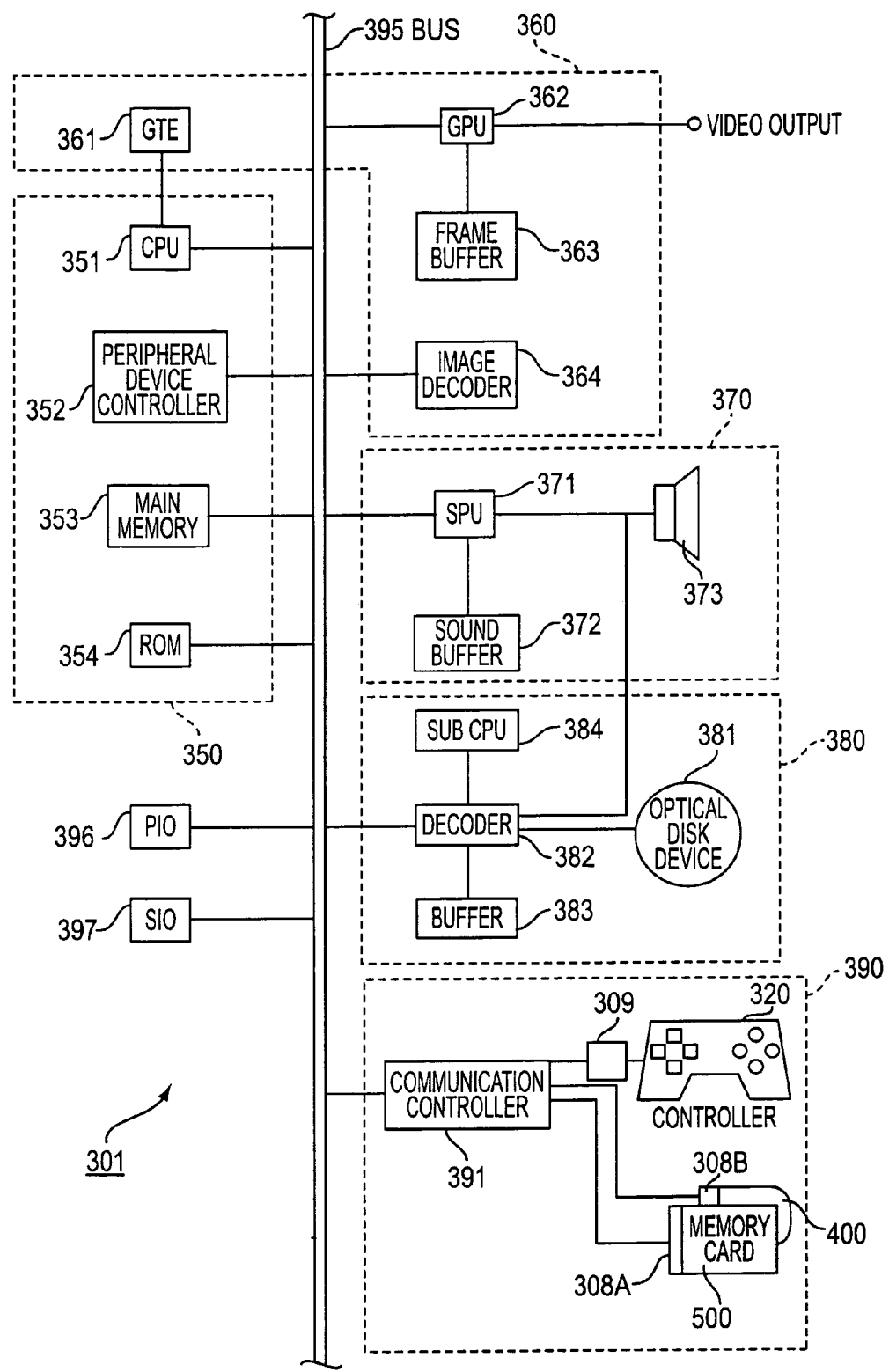
FIG. 11 is a block diagram showing the circuitry configuration of a video game device.

The appearance of video game device 301 and portable electronic device 400 is shown in FIGS. 8 through 10 as shown above. FIGS. 11 and 12 show the composition of the circuitry of video game device 301 and portable electronic device 400.

As shown in FIG. 11, video game device 301 has a control system 350, which consists of a central processing unit (CPU) 351 and its peripheral devices, etc.; a graphic system 360, which consists of a graphic processing unit (GPU) 362, which draws to a frame buffer 363, etc.; a sound system 370, which consists of a sound processing unit (SPU), etc. that produces musical tones and sound effects; an optical disk controller 380, which controls the optical disk on which application programs are recorded; a communication controller 390, which controls input and output of signals from controller 320, into which instructions from the user are input, and a data from memory card 500, on which the game settings, etc. are recorded, and from portable electronic device 400, a bus 395, to which the above parts are connected, a parallel input-output interface (PIO) 396, which consists of an interface with other devices, a serial input-output interface (SIO) 397, and a communication data processing unit 398, which performs broadcast data reception processing, etc.

Control system 350 has CPU 351, a peripheral device controller 352, which performs interrupt control and control of direct memory access (DMA) transfers, etc., a main memory 353, which consists of a random access memory (RAM), and a read-only memory (ROM) 354.

Here, CPU 351, main memory 353, graphic system 360 and sound system 370, optical disk controller 380, and communication data processing unit 398 of this video game device 301 correspond, respectively, to CPU 3, main memory 4, audio video processor 7, package media demodulator 6, and communication data decoder 3 of the video game device 1.

Main memory 353 is constituted as a memory means in which various data are stored. Stored in this main memory 353 are, for example, programs and data, etc. read in from package media.

ROM 354 is constituted as a memory means in which are stored various programs, including the so-called operating system, that manage main memory 353, graphic system 360, and sound system 370, etc.

CPU 351 controls the whole of this video game device 301 by executing the operating system stored in ROM 354.

When the power is turned on, this CPU 351 executes the operating system stored in ROM 354 according to the boot sequence and begins control of graphic system 360, sound system 370, etc. For example, when the operating system is executed, CPU 351 performs initialization of the entire video game device 301, including confirmation of operation, then controls optical disk controller 380 and executes the application program stored on the optical disk. By execution of this application program, CPU 351, in accordance with input from the users, controls graphic system 360, sound system 370, etc. and controls the display of images and the generation of sound effects and music.

Graphic system 360 includes a geometry transfer engine (GTE) 361, which does processing such as coordinate transformations, a GPU 362, which draws images in accordance with drawing instructions from CPU 351, a frame buffer 363, which stores images drawn by this GPU 362 and an image decoder 364, which decodes image data compressed and encoded by orthogonal transformations such as discrete cosine transforms or the like.

GTE 361 has, for example, a parallel computation mechanism that executes multiple operations in parallel, and is able to perform at high speed such calculations as coordinate transforms, light source calculations, and matrix or vector calculations in response to calculation requests from CPU 351. Specifically, in the case of operations in which flat shading is done, in which, for example, a single triangle-shaped polygon is drawn with the same color, this GTE 361 is able to perform coordinate calculations for up to about 1.5 million polygons per second, thereby both reducing the burden on CPU 351 and performing high-speed coordinate operations by this video game device 301.

GPU 362 draws polygons, etc. to frame buffer 363 in accordance with drawing commands from CPU 351. This GPU 362 is able to draw up to about 360,000 polygons per second.

The frame buffer 363, which consists of a so-called dual-port RAM, is able to simultaneously carry out drawing from GPU 362 or transfers from main memory 353, and reading for the sake of display. This frame buffer 363 has a capacity of, for example, 1 megabyte and can handle a matrix consisting of 1024 pixels horizontally and 512 pixels vertically, each pixel being 16 bits.

The frame buffer 363 has, besides a display region that is output as video output, a CLUT region in which is stored a color look-up table (CLUT) that is referred to when GPU 362 draws polygons, etc., and a texture region in which is stored the texture that is coordinate-transformed and mapped into polygons, etc. drawn by GPU 362 when drawing is done. The CLUT and texture regions dynamically change as the display region changes, etc.

The image decoder 364 decodes the image data of still pictures or moving pictures stored in main memory 353 and stores the decoded data into main memory 353, under control from CPU 351. The image data generated here can be used as background for images drawn by GPU 362, by storing it into frame buffer 363 via GPU 362.

The sound system 370 includes an SPU 371, which generates music and sound effects based upon instructions from CPU 351, a sound buffer 372, in which waveform data, etc. is stored by this SPU 371 and a speaker 373, which emanates the music and sound effects generated by SPU 371.

SPU 371 has, for example, an ADPCM (adaptive differential PCM) decoding function that generates audio data in which 16-bit audio data is adaptively encoded by ADPCM as 4-bit difference signals; a playback function that plays back sound effects, etc. by playing back the waveform data stored in sound buffer 372; and a modulation function that modulates and plays back the waveform data stored in sound buffer 372.

The sound system 370 can be used as a so-called sampling sound source, which generates music and sound effects based on waveform data stored in sound buffer 372 under instructions from CPU 351.

The optical disk controller 380 has an optical disk device 381, which plays back the application programs and data, etc. stored on a CD-ROM or other optical disk, a decoder 382, which decodes programs and data, etc. that have been stored, for example, with an added error correction code (ECC) and a buffer 383, which speeds up the reading of data from the optical disk by temporarily storing data from optical disk device 381. A sub-CPU 384 is connected to decoder 382.

As audio data stored on the optical disk and read by optical disk device 381, there is, besides the above-described ADPCM data, so-called PCM data, in which an analog/digital transformation is performed on audio signals. Here, as an example of ADPCM data, audio data in which the differences of 16-bit digital data are expressed in 4 bits and recorded is decoded by decoder 382, then it is supplied to SPU 371, then processing such as digital/analog transformation is carried out on it by SPU 371, then it is used for driving speaker 373. And as an example of PCM data, audio data recorded as 16-bit digital data is decoded by decoder 382 then is used for driving speaker 373.

The communication controller 390 includes a communication controller 391, which controls communication with CPU 351 via bus 395. The communication controller 391 performs communication control of a controller connection unit 309, to which is connected a controller 320, which inputs instructions from the user and memory card insertion units 308A and 308B also shown in FIG. 9, to which are connected memory card 500 and portable electronic device 400 as auxiliary memory devices that store game settings data, etc.

The communication data processor 398 has the function of performing reception processing of the information that is received by an antenna, etc.; specifically it is constituted to have the function of communication data demodulator of the video game device 1. That is, communication data processor 398 conducts modulation processing, etc. on, and receives, transmission data broadcast from a broadcast station.

The portable electronic device 400, shown in FIG. 12A, includes a control unit or means 441, a connector 442, an input unit or means 443; a display 444, a time function unit 445, a nonvolatile memory 446, a speaker 447, wireless communication means 448 and wireless reception means 449 as data transmission and reception means, a battery 450, a battery terminal 451 and a diode 452, which form a power storage means.

Control unit or means 441 is constituted using, for example, a microprocessor (labeled as such in the diagram). The control unit 441 has inside it a program memory unit 441*a*, which is a program storage means.

Connector 442 is constituted as a connection means for connecting to a slot in another information device, etc. For example, connector 442 is constituted to have the data communication function of transmitting and receiving data with video game device 301.

Input unit or means 443 consists of operation buttons, etc. for operating a stored program.

Display 444 consists of a liquid crystal display (LCD), etc., which is a display means that displays various information.

Time function unit 445 is constructed so as to display the time; for example, it displays the time on display means 444.

Nonvolatile memory 446 is an element for storing various data. For example, nonvolatile memory 446 may use a semiconductor memory element, such as a flash memory, in which the stored state remains even if the power is turned off. The nonvolatile memory 446 functions as the aforesaid memory device 14.

Because the portable electronic device 400 has battery 450, one may use as nonvolatile memory 446 a static random access memory (SRAM), which allows data to be input and output at high speed.

Due to battery 450, portable electronic device 400 can operate independently even when detached from slots 307A and 307B of main unit 302 of video game device 301.

Battery 450 is, for example, a rechargeable secondary battery. With portable electronic device 400 inserted into slots 307A and 307B of video game device 301, a power source is supplied to this battery 450 from video game device 301. In this case, power source terminal 451 is connected to the connection end of battery 450 via diode 452 to prevent reverse current, and power is supplied when main unit 302 of video game device 301 is connected.

Wireless communication means 448 is constituted as a part that performs data communication with other memory cards, etc., by infrared rays, etc. Also, wireless communication means 448 has the function of aforesaid light sensing device 12.

Wireless reception means 449 is a part that is constituted to have an antenna and demodulation circuit, etc.; that is, it is constituted as a part that receives various data transmitted by wireless broadcasting.

Speaker 447 is constituted as a sound emanating means that emanates sound in accordance with a program, etc.

The above-described parts are all connected to control means 441 and operate under the control of control means 441.

The control items of control means 441 are shown in FIG. 12B. As shown in this FIG. 12B, control means 441 has a main unit connection interface to information devices, a memory interface for inputting and outputting data from and to memory, a display interface, an operation input interface, an audio interface, a wireless communication interface, a time control, and a program download interface.

The entertainment system consists of above-described video game device 301 and portable electronic device 400.

Constituted as described above, video game device 301 can execute video games based on game programs stored on an optical disk mounted on optical disk controller 380.

Also, this portable electronic device 400 has the function of downloading an application program from video game device 301 and storing it in the program memory part 441*a* in microprocessor 441, thereby making it easy to modify the application programs or various driver softwares that operate on said portable electronic device 400.

The portable electronic device 400 can, as described above, decode the transmission digital data in the moving images broadcast from data broadcast station 2. For example, video game device 301 executes video games using decoded transmission digital data.

The data generation device of this invention, by having an image data generation means that generates image data by changing the color of part or all of a moving image per unit time based on digital data that is input, makes it possible to encode digital data in this moving image by changing the color of the moving image.

Thus it is possible to transmit digital data using television broadcasting, in which a moving image is broadcast.

The data generation method of this invention, by generating image data in which the color of part or all of a moving image is changed per unit time based on digital data makes it possible to encode digital data in this moving image, by changing the color of the moving image.

Thus it is possible to transmit digital data using television broadcasting, in which a moving image is broadcast.

The data receiver of this invention, by having a light sensing means that senses the light of part or all of the moving image displayed on a display means and a data generation means that detects the change each unit time in the color of part or all of the moving image sensed by the light sensing means and generates digital data, makes it possible to detect the change per unit time in the color of part or all of the moving image that is sensed by the light sensing means, and generate the digital data by a data generation means.

That is, the data receiver is able to detect the changes in the color of the moving image and decode the digital data. Thus, it is possible to transmit digital data by using a television broadcasting for broadcasting of moving pictures.

The data reception method of this invention, by sensing the light of part or all of the moving image displayed on the display means, detecting the change each unit time in the color of part or all of the moving image whose light is sensed, and generating digital data, makes it possible to detect changes in the color of the moving image and decode the digital data.

Thus it is possible to transmit digital data using television broadcasting, in which a moving image is broadcast.

The data communication system of this invention, by having in its data transmitter an image data generation means that changes the color per unit time of part or all of the image based on digital data that is input and generates image data and a transmission means that transmits image data, and by having in its data receiver a reception means that receives image data, a display means that displays a moving image based on the image data, a light sensing means that senses the light of part or all of the moving image displayed on the display means, and a data generation means that detects the change each unit time in the color of part or all of the moving image sensed by the light sensing means and generates the digital data, makes it possible to generate, by the image data generation means of the data transmitter, image data in which the color of part or all of the image is changed per unit time based on the input digital data, to transmit the image data by the transmission means thereof, to display the moving image by the display means of the data receiver based on image data received by the reception means thereof, to sense by the light sensing means thereof the light of part or all of this displayed moving image, to detect the change each unit time in the color of part or all of the moving image whose light is sensed by the light sensing means, and to generate digital data by its data generation means.

This data communication system makes it possible to transmit a moving image in which digital data is encoded based on changes in color, and to decode the digital data by detecting the color changes in this transmitted moving image.

Thus it is possible to transmit digital data using television broadcasting, in which a moving image is broadcast.

The data communication method of this invention, by generating image data in which the color of part or all of a moving image is changed per unit time based on digital data, displaying the moving image on a display means based on the image data, sensing the light of part or all of the moving image displayed on the display means, detecting the change each unit time in the color of part or all of the moving image whose light is sensed, and generating the digital data, makes it possible to transmit a moving image in which digital data is encoded based on changes in color, and to decode the digital data by detecting the color changes in this transmitted moving image.

Thus it is possible to transmit digital data using television broadcasting, in which a moving image is broadcast.

The present invention makes it possible to provide a data generation device and data generation method, a data receiver and data reception method, and a data communication system and data communication method that can transmit digital data other than the moving image data that is the main transmission object of the moving image transmission and reception equipment that makes use of an already available moving image transmitter-receiver, moving image transmission means, etc.

What is claimed is:

1. A data receiver for receiving a second image data, the second image data for playing a game on a portable terminal, said second image data comprising image data of a first moving image and digital data encoded as color of part or all of said first moving image, the data receiver including the portable terminal, the portable terminal comprising:
   a light sensing means that senses the light of part or all of a second moving image displayed on a display means, said second moving image including said digital data being encoded as the color of part or all of said second moving image data; and
   a digital data decoding means that detects the change in each unit time in the color of part or all of said second moving image sensed by said light sensing means and decodes and generates said digital data;
   wherein said light sensing means includes a display assembled into said light sensing means and means for displaying a third moving image thereon; and
   wherein said third moving image displayed on said display of said light sensing means is generated based on said digital data that is decoded by said digital data decoding means and said third moving image includes a game character for playing the game based said digital data.

2. A data receiver as described in claim 1, wherein said color change at least one of the elements hue, brightness, and chroma changes.

3. A data reception method of receiving a second image data, the second image data for playing a game on a portable terminal, said second image data comprising image data of a first moving image and digital data encoded as color of part or all of said first moving image, the data reception method comprising the steps of:
   sensing the light of part or all of said second moving image displayed on a display means with a light sensing means, said second moving image including said digital data being encoded as the color of part or all of said first moving image data; and
   detecting a change in each unit time in the color of part or all of said second moving image whose light is sensed and decoding said digital data,
   wherein said light sensing means includes a display assembled into said light sensing means and means for displaying a third moving image thereon, and
   wherein said displaying of said third moving image on said display of said light sensing means is generated based on said digital data that is decoded by said digital data decoding means and said third moving image includes a game character for playing the game based on said digital data.

4. The data reception method as described in claim 3, wherein said color change at least one of the elements hue, brightness, and chroma changes.

5. A data communication system that transmits a moving image from a data transmitter to a data receiver comprising:
   said data transmitter including
      a first source for supplying image data of a first moving image, and a second source for supplying digital data,
      an image data encoding means that encodes, each unit time, said digital data as the color of part or all of said first moving image based on said digital data that is input to the said image data and generates a second image data, and
      a transmission means that transmits said second image data; and
   said data receiver including a potable terminal, the portable terminal including
      a reception means that receives said second image data for playing a game on the portable terminal,
      a display means that displays a second moving image based on said second image data, said second moving image including said digital data being encoded as the color of part or all of said first moving image data,
      a light sensing means that senses a part or all of said second moving image displayed on said display means, said light sensing means having a display assembled therein,
      a digital data decoding means that detects the change each unit time in the color of part or all of said second moving image sensed by said light sensing means and decodes and generates said digital data, and
      means for displaying a third moving image on the display of said light sensing means,
   wherein said third moving image displayed on said display of said light sensing means is generated based on said digital data that is decoded by said digital data decoding means and said third moving image includes a game character for playing the game based on said digital data.

6. The data communication system as described in claim 5, wherein said color change at least one of the elements hue, brightness, and chroma changes.

7. A data communication method comprising the steps of:
generating a second image data by encoding digital data as the color of part or all of a first moving image is changed in each unit time based on said digital data that is input to image data of said first moving image;
displaying said first moving image on a display means based on said second image data;
sensing the light of part or all of the first moving image displayed on said display means, and
detecting a change in each unit time in the color of part or all of said second moving image whose light is detected, and decoding the digital data, the second image for playing a game on a portable terminal,
wherein said sensing is performed with a light sensing device having a display assembled therein and means for displaying a third moving image on said display of said light sensing device, and
wherein said displaying of said third moving image on said display of said light sensing means is generated based on said decoded digital data and said third moving image includes a game character for playing the game based on said decoded digital data.

8. The data communication method as described in claim 7, wherein said color change at least one of the elements hue, brightness, and chroma changes.

9. A data reception method in accordance with claim 3, further comprising the step of removing said second moving image from said display means after displaying said third moving image on said display of said light sensing means.

10. A data communication system in accordance with claim 5, wherein said third moving image is displayed on said display of said light sensing means after said light sensing means senses a part or all of said second moving image displayed on said display means.

11. A data communication system in accordance with claim 10, further comprising means for removing said second moving image from said display means after said third moving image is displayed on said display of said light sensing means.

12. A data communication system in accordance with claim 5, wherein said light sensing means is a portable communication terminal which includes storage means for storing one or more images displayed on said light sensing means display.

13. A data communication method in accordance with claim 7, further comprising the step of removing said second moving image from said display means after displaying said third moving image on said display of said light sensing means.

* * * * *